(12) United States Patent
Albee, Sr.

(10) Patent No.: US 11,479,657 B2
(45) Date of Patent: Oct. 25, 2022

(54) SYSTEM AND METHOD FOR FABRICATING NANOPARTICLE FILLER MATERIAL DISPERSIONS AND PRODUCING IMPROVED COMPOUNDS CONTAINING HYDROPHOBIC PLASTIC POLYMERS

(71) Applicant: Paul Albee, Sr., Lambertville, NJ (US)

(72) Inventor: Paul Albee, Sr., Lambertville, NJ (US)

( * ) Notice: Subject to any disclaimer, the term of this patent is extended or adjusted under 35 U.S.C. 154(b) by 0 days.

(21) Appl. No.: 16/919,076

(22) Filed: Jul. 1, 2020

(65) Prior Publication Data
US 2020/0332086 A1 Oct. 22, 2020

Related U.S. Application Data

(63) Continuation-in-part of application No. 15/983,175, filed on May 18, 2018, now abandoned.

(51) Int. Cl.
*C08L 1/02* (2006.01)
*C08L 5/08* (2006.01)

(52) U.S. Cl.
CPC .. *C08L 1/02* (2013.01); *C08L 5/08* (2013.01)

(58) Field of Classification Search
None
See application file for complete search history.

(56) References Cited

U.S. PATENT DOCUMENTS

| | | |
|---|---|---|
| 3,453,356 A | 7/1969 | Kent, Jr. et al. |
| 3,931,094 A | 1/1976 | Segal et al. |
| 6,362,252 B1 | 3/2002 | Prutkin |
| 9,453,121 B2 | 9/2016 | Guan |
| 9,909,256 B2 * | 3/2018 | Nuopponen ............ C08L 1/286 |
| 10,280,294 B2 | 5/2019 | Gardner et al. |
| 2003/0021915 A1 | 1/2003 | Rohatgi et al. |

(Continued)

FOREIGN PATENT DOCUMENTS

WO WO 2020/086419 A1 * 4/2020

OTHER PUBLICATIONS

A brochure for Rosin, ester with pentaerythritol (CAS. No. 8050-26-8) by Millipore Sigma, 4 pages, Downloaded on Aug. 11, 2021.*

(Continued)

*Primary Examiner* — Tae H Yoon
(74) *Attorney, Agent, or Firm* — LaMorte & Associates, P.C.

(57) ABSTRACT

A system and method of forming a plastic blend that includes nanoparticles of filler material evenly dispersed, without agglomeration of particles, throughout a hydrophobic polymer. A slurry is created that contains water and nanoparticles of a filler material. The filler materials are selected from a group consisting of crystalline cellulose, cellulose fiber, chitosan and chitin. A dispersion aid is provided that has a melting point in a temperature range. The slurry is heated and mixed to a temperature that is above the melt point range of the dispersion aid. The dispersion aid is added. The slurry is cooled to a temperature that is below the melting point of the dispersion aid. This causes the dispersion aid to solidify and entrap the nanoparticles within solid compound. The solid compound is dried and then reduced into a powder. The powder is the fill composition that is melt compounded for use.

15 Claims, 4 Drawing Sheets

(56) References Cited

U.S. PATENT DOCUMENTS

| | | |
|---|---|---|
| 2009/0203642 A1 | 8/2009 | Morganti et al. |
| 2016/0152811 A1* | 6/2016 | Gardner .............. B29C 45/0001 524/35 |
| 2020/0102425 A1* | 4/2020 | Youngblood ........... C08L 77/06 |
| 2020/0399444 A1* | 12/2020 | Miyazaki .................. C08L 7/00 |

OTHER PUBLICATIONS

A brochure for CAS No. 8050-26-8 by Chemical Book, 2 pages, Copyrighted 2017, Downloaded on Aug. 11, 2021.*
A brochure for Ceresin wax, CAS No. 8001-75-0, 3 pages, Copyrighted 2017 A, Downloaded on Aug. 11, 2021.*
A brochure for polyethylene wax by TDM, 7 pages, Copyrighted 2010, Downloaded on Aug. 11, 2021.*
English abstract of CN 111138718, May 12, 2020, 6 pages, China.*
A brochure of INEOS PP H05A-00 by Channel Prime Alliance, Downloaded on Aug. 11, 2021.*

* cited by examiner

SYSTEM AND METHOD FOR FABRICATING NANOPARTICLE FILLER MATERIAL DISPERSIONS AND PRODUCING IMPROVED COMPOUNDS CONTAINING HYDROPHOBIC PLASTIC POLYMERS

RELATED APPLICATIONS

This application is a continuation-in-part of U.S. patent application Ser. No. 15/983,175, filed May 18, 2018, now abandoned.

BACKGROUND OF THE INVENTION

1. Field of the Invention

In general, the present invention relates to the fabrication and application of fillers used to enhance the properties of various hydrophobic plastic polymers. More particularly, the present invention relates to the method of dispersing various fillers and mixing those fillers with a hydrophobic plastic polymer to form more homogeneous blends prior to thermoplastic compounding.

2. Prior Art Description

There are many plastic polymers used for injection molding and plastic extrusion that are hydrophobic. During manufacture, plastic polymers are often mixed with various fillers. The fillers serve at least one of two potential purposes. First, fillers can be used to reduce the costs of the polymer. The fillers occupy space and replace the expensive resin with less expensive compounds. This can often be done without adversely affecting the material characteristics of the plastic polymer. Second, fillers can be used to enhance the material characteristics of the plastic polymer. For example, in polypropylene blends, fillers can be added to increase the strength of a fiber, injection molded part or extruded sheet and film. Fillers can be added to increase the flexural strength of the plastic polymer. Other fillers may increase the durability, decrease permeability, and/or alter the molding and extrusion characteristics of the plastic polymer, just to name a few examples.

Fillers for hydrophobic plastic polymers are solids. The fillers are typically combined with the hydrophobic plastic polymer by melt processing while the plastic polymer is molten. This enables the filler to mix with the hydrophobic plastic polymer and become evenly distributed in the plastic compound. Solid fillers, in the form of ground powders are often mixed with hydrophobic plastic polymers. A particular problem occurs when the powdered filler is fine enough to be considered to contain nanoparticles. In nanotechnology, a nanoparticle is defined as a small particle that behaves as a whole unit with respect to its transport and properties. Nanoparticles are typically particles between 1 nanometer and 500 nanometers in average thickness or diameter, with particle sizes below 100 nanometers being the standard. Many nanoparticles are created in water the nanoparticles have a very slight mass. However, the nanoparticles are influenced by ionic bonding. These inter-particle attractive forces can cause the nanoparticle to agglomerate as the water is removed and remain agglomerated during and after mixing in molten plastic.

When melt compounding plastic polymers for injection molding and extrusion, fillers such as nano cellulose crystals, nano cellulose fiber, nano chitosan crystals and nano chitin whiskers, have been used. Such mixtures are exemplified by U.S. Pat. No. 9,453,121 to Guan, and U.S. Patent Application Publication No. 2003/0021915 to Rohatgi et al. In the prior art, these fillers tend to form agglomerates much larger than nanoparticles. However, when such fillers are produced in a water slurry, they are free of agglomeration and in nano-scale particle sizes, the various nanoparticles tend to clump together and agglomerate as water is extracted from the slurry. These agglomerated particles persist when the nano fillers are mixed with plastic polymers. The agglomeration prevents the nanoparticles from dispersing evenly through the plastic polymer. The agglomeration of the filler in the polymer matrix adversely affects the strength and permeability of the plastic compound and articles made from the compound. This is especially troublesome if the plastic blend is being used to form a thin element, such as a film, a fiber, a plastic sheet, a blow molded article or a foamed product, where thin-film strength and permeability are highly relevant.

To prevent agglomeration, nanoparticle fillers, such as nano-cellulose crystals, nano-cellulose fibers, nano-chitin whiskers and nano-chitosan slurries have to be mixed with dispersion aids prior to water being extracted from the slurry and melt processed into the plastic compound. The dispersion aids prevent agglomeration of the nanoparticles and ensures that the nanoparticle disperse uniformly, without agglomeration. The problem is that nano cellulose-based, nano chitin-based and nano chitosan-based fillers are traditionally produced in water. Accordingly, slurries of these fillers tend to be aqueous based. As a consequence, aqueous slurries are not compatible with hydrophobic plastic polymers, such as polyethylene polymers, polypropylene polymers, PLA (poly lactic acid) based polymers, polyvinyl chloride polymers and thermoplastic elastomers.

In U.S. Pat. No. 10,280,294 to Gardner, a system is described where an improved fill material is created by mixing nano fibers of cellulose with a maleric-anhydride copolymer. The mixing is performed in an aqueous solution, wherein the material is dried and ground prior to use. Once dried, the two materials are merely mixed together. This process inhibits some of the inter particle attractive forces that cause the nanoparticles to agglomerate. However, many of the nanoparticles remain exposed and a significant degree of agglomeration still occurs.

A need therefore exists for an improved system and method for dispersing nanoparticles throughout plastic compounds without particle agglomeration or the use of an aqueous slurry. Overcoming these limitations would permit the development of new improved polymer compounds that contain nano-fillers and improve the material properties of resulting plastic articles such as film, fiber, injection molded and extruded parts. This need is met by the present invention as described and claimed below.

SUMMARY OF THE INVENTION

The present invention is a system and method of forming a plastic compound that includes nanoparticles of filler material evenly dispersed throughout a hydrophobic plastic polymer. The system and method start from a slurry that contains water and nanoparticles of a filler material. The preferred filler materials are selected from a group consisting of nano-cellulose crystals, nano-cellulose fibers, nano-chitosan crystals and nano-chitin whiskers. A dispersion aid that contains at least one copolymer is provided, wherein the dispersion aid has a melting point in a certain temperature range.

The slurry is heated and mixed to a temperature that is above the melt temperature range of the dispersion aid. The dispersion aid is added to the slurry, wherein the dispersion aid becomes molten within the slurry. The dispersion aid is then mixed throughout the slurry. The slurry is then cooled to a temperature that is below the melting point of the dispersion aid. This causes the dispersion aid to solidify, entrap, and disperse the nanoparticles. The solid granules are dried and are then reduced into a powder.

The powder is the fill composition that can be melt processed into the polymer to form and improve plastic compound or a master batch that is suitable for extrusion, injection molding and other plastic processes.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system and method can be embodied in many ways, only one exemplary embodiment is illustrated. The exemplary embodiment is being shown for the purposes of explanation and description. The exemplary embodiment is selected in order to set forth one of the best modes contemplated for the invention. The illustrated embodiment, however, is merely exemplary and should not be considered a limitation when interpreting the scope of the appended claims.

Figure 1:
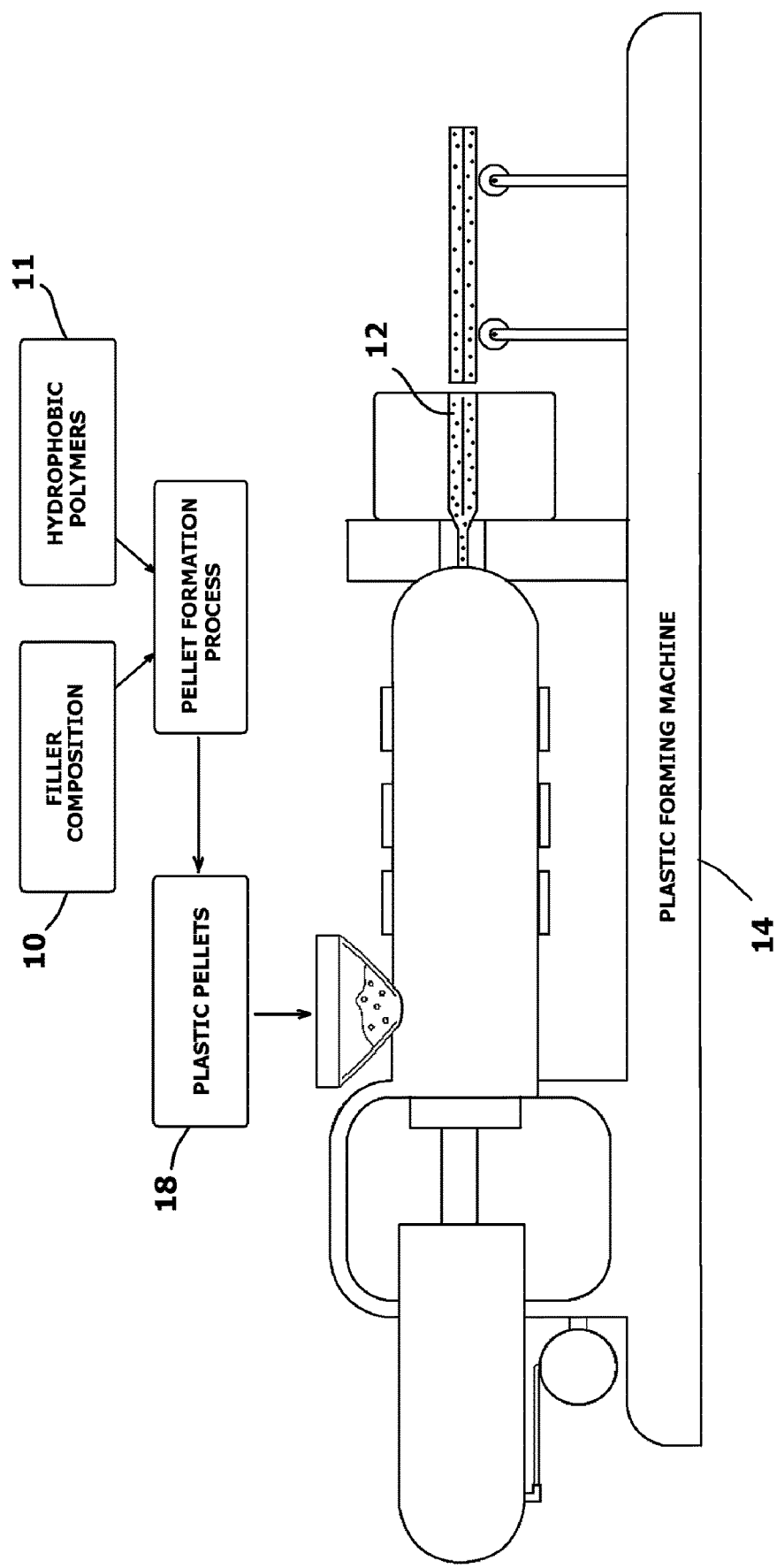
FIG. 1 shows a schematic of a plastic melt compounding equipment can process plastic pellets and a filler composition of the present invention.

Referring to FIG. 1, it will be understood that the purpose of the present invention it to manufacture a filler composition 10 that will mix well with hydrophobic plastic polymers 11 to form an improved plastic compound 12 that can be extruded, molded or otherwise formed into a product by a plastic forming machine 14. The filler composition 10 and the hydrophobic plastic polymers 11 are melt processed into plastic pellets 18, using a pellet formation process. The plastic pellets 18 are used as supply material for a plastic forming machine 14, such as an injection molding machine, a blow molding machine, a film formation machine, an extrusion machine or the like. In FIG. 1, the exemplary plastic forming machine 14 is an extruder. It will be understood that the illustration of such a machine is exemplary and that other plastic forming machines can be substituted.

The filler composition 10 contains nanoparticles that disperse evenly throughout the plastic pellets 18, and thus the plastic compound 12 being formed. In the formation of the plastic pellets 18, the hydrophobic plastic polymers 11 are melted and mixed with the filler composition 10. The plastic pellets 18 form a hydrophobic flow mass of the plastic compound 12 when melted. The hydrophobic plastic polymers 11 used in the formation of the plastic pellets 18 are preferably selected from a group consisting of polyethylene, polyethylene copolymers, polypropylene, polypropylene copolymers, PLA (poly lactic acid) based polymers, polyvinyl chloride (homopolymers and copolymers) based compounds and thermoplastic elastomers.

Figure 2:
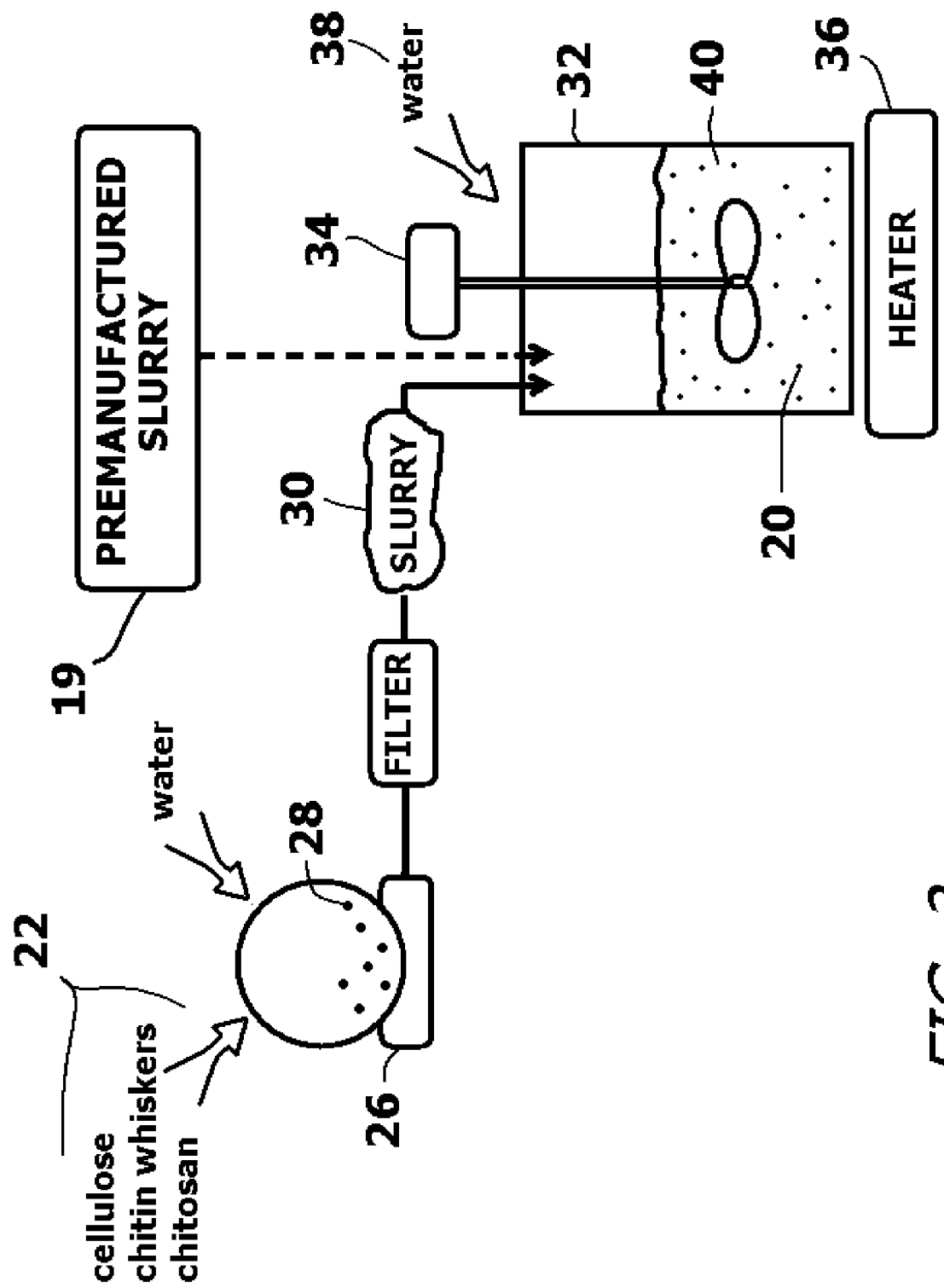
FIG. 2 shows a schematic of manufacturing facilities used in the initial steps of forming the filler composition used in FIG. 1.
Figure 3:
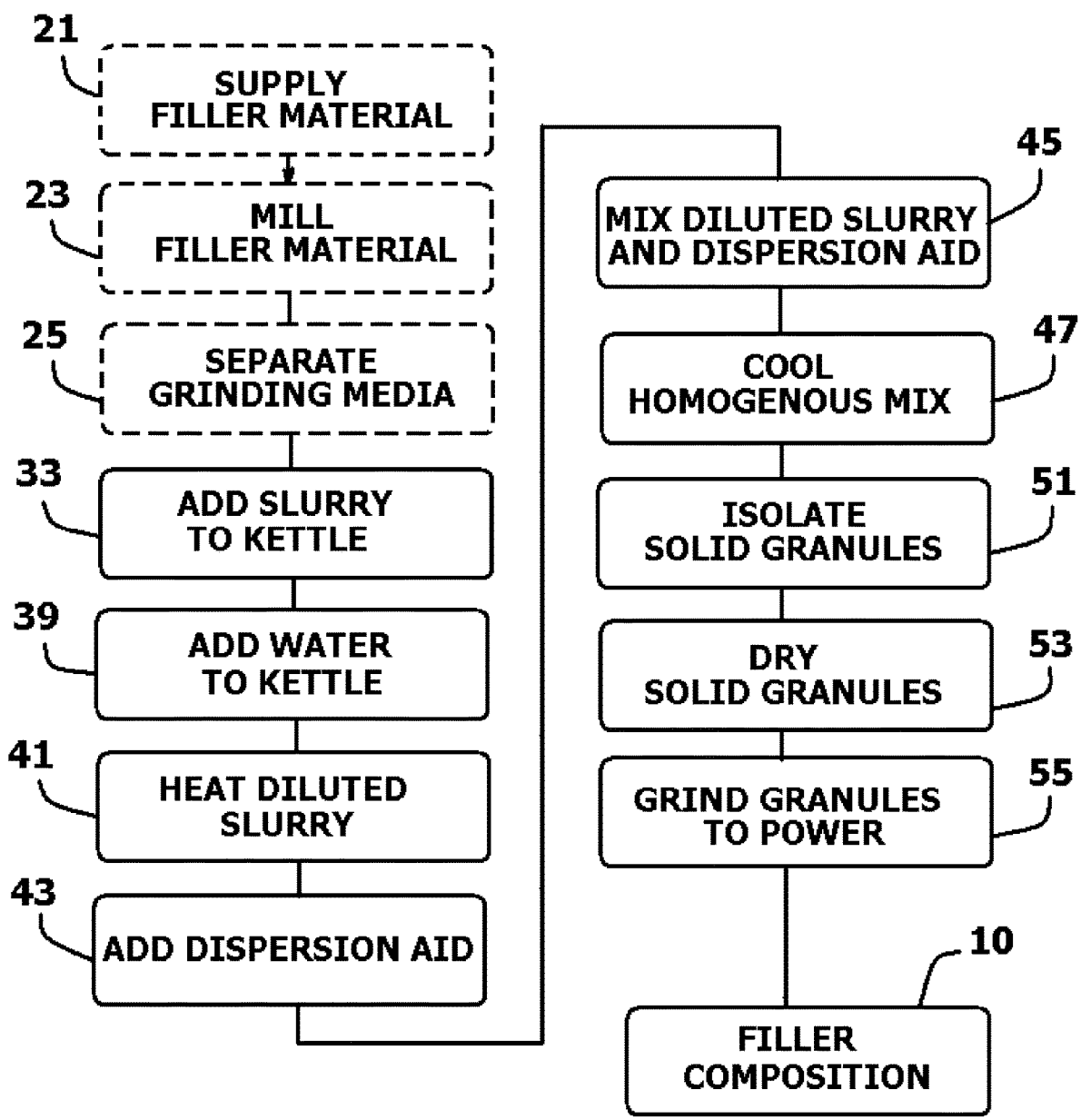
FIG. 3 is a block diagram that outlines the method steps used to form the filler composition used in FIG. 1.

Referring to FIG. 2 in conjunction with FIG. 3, the formation of the filler composition 10 is described. The filler composition 10 contains nanoparticles 20. The nanoparticles 20 can be derived from processed filler material 22 or from a premanufactured nano filler slurry 19. If a premanufactured nano filler slurry 19 is used, the slurry 19 contains nanoparticles 20 elected from a group consisting of nano-cellulose crystals, nano-cellulose fibers, nano-chitosan, and nano-chitin whiskers. These nanoparticles 20 are preprocessed by a source manufacturer prior to purchase and use. Accordingly, the need to perform the processes of Block 21, Block 23 and Block 25 in FIG. 3 and be bypassed.

If the nanoparticles 20 are processed from filler material 22, the filler material 22 is selected from a group consisting of crystalline cellulose, cellulose fiber, chitosan and chitin. See Block 21. The nanoparticles 20 of the filler slurry 22 can be supplied directly in water 22. Alternatively, the filler material 22 and water 24 are introduced into a wet mill 26 that contains particles of rigid grinding media 28. See Block 23. The rigid grinding media 28 has a particle diameter of less than three millimeters with a preferred particle diameter of less than one millimeter. Examples of an appropriate rigid grinding media 28 include stainless steel particles, titanium particles, alumina, zirconium oxide stabilized with yttrium, and zirconium oxide stabilized with magnesia, zirconium silicate and/or glass.

Once the filler material 22 is ground to the proper nanoparticle size, the grinding media 28 is separated from the remaining nanoparticles 20 of fill material 22 and water 24. See Block 25. This leaves the nanoparticles 20 and the water 24 and form a ground slurry 30. The ground slurry 30 contains 1% to 30% filler-to-water by weight, with a preferred concentration of between 3% and 12%. If a premanufactured nano filler slurry 19 is used, a preferred concentration of between 3% to 12% is also used. The slurry 30, 19 is added to a mixing kettle 32. See Block 33. The mixing kettle 32 contains a mixer 34 and a heater 36 for mixing and heating the contents of the kettle 32. Distilled water 38 is added to the mixing kettle 32 in a concentration of between 2-4 parts distilled water for every one part slurry, by volume. This concentration develops a uniform blend during mixing. See Block 39. The slurry/water mixture creates a diluted slurry 40 in the kettle 32. The diluted slurry 40 is then heated to a processing temperature. See Block 41.

A dispersion aid 42 will be added to the diluted slurry 40. The dispersion aid 42 includes a low molecular weight of polymer and/or copolymer with a given melting temperature. The processing temperature of the diluted slurry 40 is heated to be above the melting temperature of the selected dispersion aid 42. More specifically, the processing temperature of the mixing kettle 32 should be at least 10 degrees Celsius hotter than the melting temperature of the dispersion aid 42. In this manner, the dispersion aid 42 will become molten when mixed with the heated diluted slurry 40.

The dispersion aid 42 can be one or more low molecular weight polymers and/or copolymers, wherein low weight is considered to be between 200 mw and 20,000 mw. The dispersion aid 42 is solid at room temperature, and has a preferred melting point in the range of 40° C. to 140° C. Preferred dispersion aids include, but are not limited to the following: glycerol monostearate with a mono content of 40% to 90%, a melting point between 40° C. to 60° C., and an average molecular weight of about 358; glycerol monolaurate with a mono ester content of 90%, a melting point between about 52° C. to 65° C., and an average molecular weight of 275; triglycerides that have a melt point of 60° C.; glycerol mono-oleates that have a melting point of 60° C.; synthetic ester waxes that are prepared by the reaction of a fatty acid and fatty alcohols with different carbon chain lengths, having a melting point between 60° C. to 75° C., and with a straight or branched chain; natural sources of ester wax, such as beeswax and carnauba wax; candelilla wax, with a melting point between 67° C. to 79° C.; amide wax-ethylene bis-stearamide (EBS) with a melting point of from about 72° C. to about 76° C.; montan wax (also known as OP wax) with a melting point of between 82° C. to 95° C.; low molecular weight ethylene-acrylic acid (EAA), ethylene vinyl acetate (EVA), ethylene butyl acrylate (EBA) and ethylene methyl acrylate (EMA) copolymers and terpolymers with a melting point of between 55° C. to 80° C.; rosin esters with a melting point of between 84° C. to 95° C.; low molecular weight styrene, polyethylene or polypropylene maleic anhydride copolymers, with a melting point between 95° C. to 150° C.; and low molecular weight polyamide, melting point range between 80° C. to 150° C.

Figure 4:
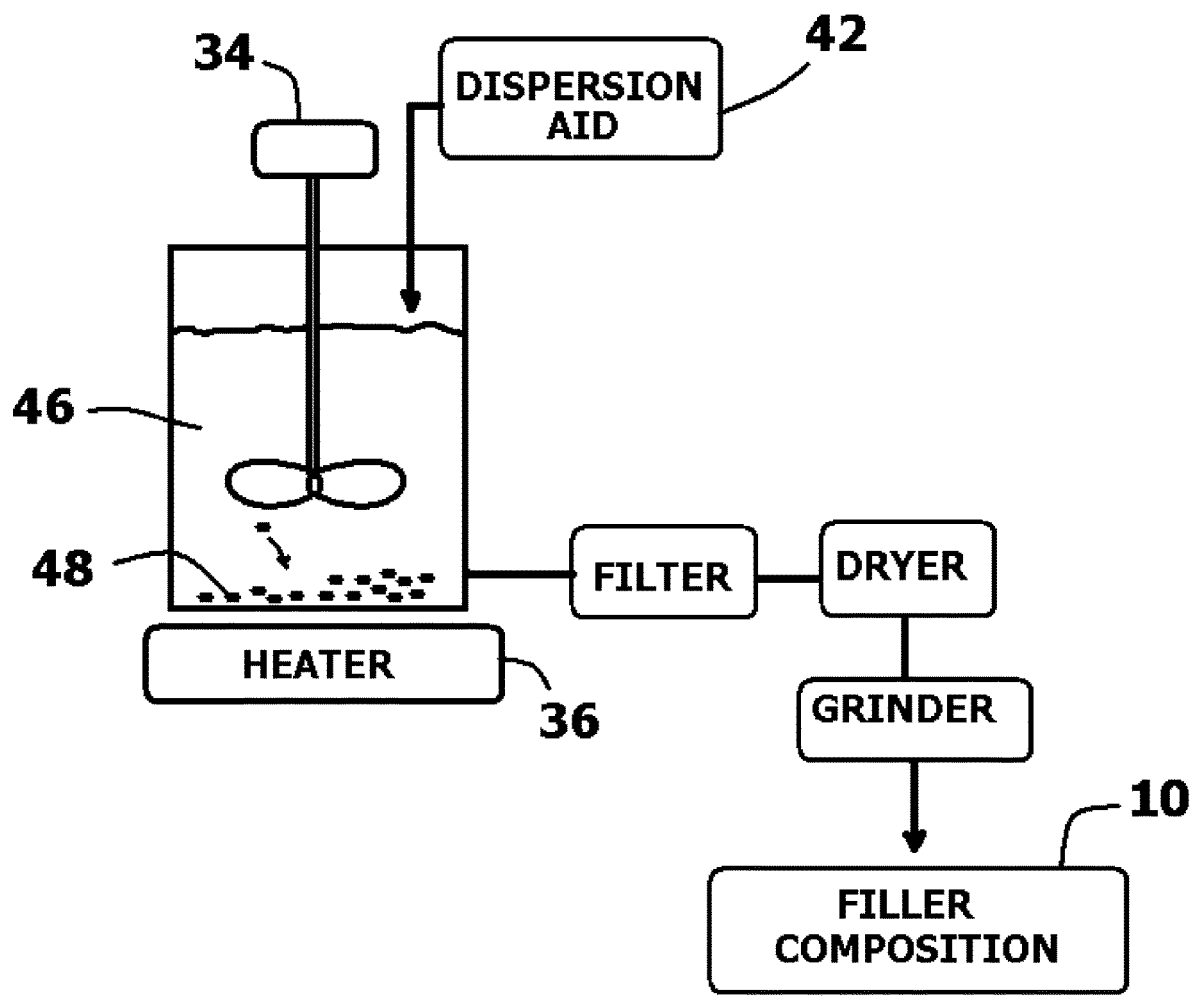
FIG. 4 shows a schematic of manufacturing facilities used in the final steps of forming the filler composition used in FIG. 1.

Referring to FIG. 4 in conjunction with FIG. 3 and FIG. 2, it can be seen that the dispersion aid 42 is mixed into the heated diluted slurry 40. See Block 43. The dispersion aid 42 becomes molten as it assumes the temperature of the diluted slurry 40. The molten dispersion aid 42 is then mixed into the diluted slurry 40 until a homogenous mix 46 is produced. See Block 45. The homogenous mix 46 is allowed to cool to a temperature below the melting point of the dispersion aid 42. See Block 47. Mixing is performed until the temperature of the homogenous mix 46 is at least 10° C. below the melting temperature of the dispersion aid 42. As the homogenous mix 46 cools below the melt temperature of the dispersion aid 42, the dispersion aid 42 begins to solidify. As the dispersion aid 42 solidifies, it coats and wets out the filler nanoparticles 20 that are also present in the cooling homogenous mix 46. As the dispersion aid 42 solidifies, it binds and separates the nanoparticles 20, therein forming solid granules 48. The solid granules 48 contain nanoparticles 20 dispersed into, and by, the solidified dispersion aid 42. The solid granules 48 can be separate from the water, whereby the heated kettle 32 is now filled with a mixture of solid granules 48 and residual water.

The contents of the kettle 32 are dried directly or first filtered to separate the solid granules 48 from the residual water. See Block 51. Once separated, the solid granules 48 are dried, or left to dry, until the solid granules 48 contain less than 1% water by weight. The solid granules 48 are then ground into a free-flowing powder, which is the filler composition 10. The dispersion aids keep the filler 10 separated and are therefore less susceptible to inter particle attractive forces. Furthermore, the fill composition 10 contains nanoparticles 20 dispersed in or otherwise encased within the dispersion aid 42. This disrupts the interfacial layers of the nanoparticles 20 by inhibiting the nanoparticles 20 from creating and holding static charges and reacting to ionic forces. After grinding, the filler composition 10 preferably contains between 20% and 40% of the filler material by weight. However, concentrations up to 90% by weight can be made. The filler composition 10 is then used in the formation of plastic pellets 18 to supply the plastic formation machine 14. During melt processing 14, the plastic pellets 18 containing the filler composition 10 are melted and mixed. The operating temperature of the plastic formation machine 14 is well above the melting temperature of the dispersion aid 42 within the filler composition 10. The dispersion aid 42 melts, therein dispersing the nanoparticles 20 into the molten plastic. The nanoparticles 20 are not agglomerated and therefore dispersed uniformly in the molten plastic. The result is that the nanoparticles 20 are dispersed evenly throughout the molten plastic compound 12.

The present invention has been reduced to practice and various formulations have been made and analyzed. Some examples are provided below.

Example 1

Nanoparticles—cellulose crystals
Dispersion aid—glycerol monostearate with EVA and cross-linking agent
Slurry concentration—12.6% solids
Course particles concentration–40% filler composition
Plastic pellets—High Density Polyethylene (1.2 melt index and density of 0.96) at 5% by weight—
Extrusion compounding temperatures 320° C.-380° C.
Results—Full dispersion of nanoparticles in molded plastic parts and extruded film no signs of nanoparticle agglomeration.

Example 2

Nanoparticles—cellulose fibers
Dispersion aid—Glycerol monolaurate (90% mono) with a low molecular weight polypropylene maleic anhydride copolymer
Slurry concentration—3% solids
Course particles concentration–45% filler composition
Plastic pellets—Polypropylene (homopolymer, 4 MI) at 6% by weight
Extrusion compounding temperatures 340° C.-390° C.
Results—Full dispersion of nanoparticles in molded plastic, no signs of nanoparticle agglomeration.

Example 3

Nanoparticles—chitin whiskers
Dispersion aid—Glycerol monostearate (90% mono)
Slurry concentration—10% solids
Course particles concentration–40% filler composition
Plastic pellets—PLA (Corbion L-175) at 5% by weight
Extrusion compounding temperatures 330° C.-390° C.
Results—Full dispersion of nanoparticles in the PLA melt and sheet, no signs of nanoparticle agglomeration.

Example 4

Nanoparticles—cellulose fiber
Dispersion aid—Ester wax (melt point 65 C)
Slurry concentration—2% solids
Course particles concentration–50% filler composition
Plastic pellets—PVC dry blend (a profile formulation based on a K-64 homopolymer resin)
Extrusion processing temperatures 360° C.-390° C.
Results—Full dispersion of nanoparticles in extruded PVC profile and film, no signs of nanoparticle agglomeration.

It will be understood that the embodiments of the present invention that are illustrated and/or described are merely exemplary and that a person skilled in the art can make many variations to those embodiments. All such embodiments are intended to be included within the scope of the present invention as defined by the claims.

What is claimed is:

1. A method of forming a plastic blend, comprising:
providing a slurry that contains water and nanoparticles of a filler material;
providing a dispersion aid with a melting point in a first temperature range;
heating said slurry to a first temperature that is above said first temperature range;
adding said dispersion aid to said slurry, wherein said dispersion aid becomes molten in said slurry;
cooling said slurry to a second temperature while continuously mixing said slurry, wherein said second temperature is below said first temperature range, wherein said dispersion aid solidifies at said second temperature and coats said nanoparticles while separating said water from said nanoparticles, therein forming solid granules;
separating said solid granules from said slurry;
reducing said solid granules to a powder; and
mixing said powdered into a molten plastic polymer to form said plastic blend.

2. The method according to claim 1, wherein said filler material is selected from a group consisting of crystalline cellulose, cellulose fiber, chitosan and chitin.

3. The method according to claim 1, wherein said molten plastic polymer is hydrophobic.

4. The method according to claim 3, wherein said molten plastic polymer is selected from a group consisting of polyethylene polymers, polypropylene polymers, poly lactic acid based polymers, polyvinyl chloride polymers and thermoplastic elastomers.

5. The method according to claim 1, wherein said dispersion aid contains at least one polymer or copolymer having a molecular weight between 200 and 20,000.

6. The method according to claim 1, wherein providing a slurry that contains water and nanoparticles includes milling said filler material into said nanoparticles and adding said water to said nanoparticles.

7. The method according to claim 1, wherein said nanoparticles have an average size of between 1 nanometer and 100 nanometers.

8. The method according to claim 1, wherein said temperature range for said melting point is between 40° C. and 140° C.

9. The method according to claim 1, further including the step of drying said solid granules.

10. A method of forming a filler compound for use in a plastic blend, comprising:
reducing filler material into nanoparticles;
mixing said nanoparticles with water to form a slurry,
heating said slurry to a first temperature;
adding at least one dispersion aid to said slurry, wherein said at least one dispersion aid has a melting point below said first temperature, wherein said slurry melts said at least one dispersion aid;
cooling said slurry while mixing said slurry, wherein said at least one dispersion aid solidifies and coats said nanoparticles, therein separating said nanoparticles from said water within said slurry and forming solid granules;
separating said solid granules from said slurry; and
reducing said solid granules to a power, therein forming said filler compound.

11. The method according to claim 10, wherein said filler material is selected from a group consisting of nano-cellulose crystals, nano-cellulose fiber, nano-chitosan whiskers and nano-chitin whiskers.

12. The method according to claim 10, wherein said at least one dispersion aid is a polymer or copolymer having a molecular weight between 200 and 20,000.

13. The method according to claim 10, wherein said at least one dispersion aid is selected from a group consisting of glycerol monostearate, triglycerides, glycerol monooleates, synthetic ester waxes, candelilla wax, amide wax, ethylene bis-stearamide, ethylene-acrylic acid, ethylene vinyl acetate, ethylene butyl acrylate and ethylene methyl acrylate copolymers and terpolymers, rosin esters, polyethylene, polypropylene maleic anhydride copolymers, and polyamide.

14. The method according to claim 10, wherein said nanoparticles have an average size of between 1 nanometer and 100 nanometers.

15. The method according to claim 10, further including the step of drying said solid granules.

* * * * *